(12) United States Patent  
Matsuhira (10) Patent No.: US 8,090,217 B2  
(45) Date of Patent: Jan. 3, 2012

(54) IMAGE PROCESSING APPARATUS, IMAGE PROCESSING METHOD, AND PRINTING APPARATUS

(75) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 832 days.

(21) Appl. No.: 12/171,839

(22) Filed: Jul. 11, 2008

(65) Prior Publication Data

US 2009/0016628 A1 Jan. 15, 2009

(30) Foreign Application Priority Data

Jul. 12, 2007 (JP) ................................ 2007-182716

(51) Int. Cl.
  *G06K 9/36* (2006.01)
  *G06K 9/46* (2006.01)
(52) U.S. Cl. ...................................... 382/276; 382/244
(58) Field of Classification Search .................. 382/276, 382/236, 244; 348/14.12, 14.14, 14.15, 220.1
  See application file for complete search history.

(56) References Cited

U.S. PATENT DOCUMENTS

2002/0158895 A1* 10/2002 Murase et al. ................ 345/716
2007/0103544 A1* 5/2007 Nakazawa ...................... 348/38
2007/0229673 A1* 10/2007 Araya et al. ............... 348/220.1

FOREIGN PATENT DOCUMENTS

JP 2005-284636 10/2005

* cited by examiner

*Primary Examiner* — Yon Couso
(74) *Attorney, Agent, or Firm* — DLA Piper LLP (US)

(57) ABSTRACT

An image processing apparatus that creates a still image from a motion picture. A storage section has a storage region for correction required when a target image with a predetermined determination size is corrected by using a plurality of images. A size determining section determines whether or not the size of the target image designated as a still image is equal to or smaller than the determination size. An image extracting section extracts from the motion picture a plurality of images including a target image designated as a still image and a first image for correction used when performing correction using a plurality of images. A still image creating section creates the still image by extracting the plurality of images by means of the image extracting section, and by executing first correction for making a correction using the plurality of images when a result of the determination indicates that the size of the target image is equal to or smaller than the determination size and that creates the still image by extracting only the target image designated as the still image by means of the image extracting section, and by executing second correction for correcting the extracted target image when the determination result indicates that the size of the target image is larger than the determination size.

8 Claims, 10 Drawing Sheets

FIG. 10A
ORIGINAL IMAGE

FIG. 10B
FRACTAL INTERPOLATION OF
A PLURALITY OF FRAMES

FIG. 10C
AVERAGING PROCESSING OF
A PLURALITY OF FRAMES

IMAGE PROCESSING APPARATUS, IMAGE PROCESSING METHOD, AND PRINTING APPARATUS

CROSS-REFERENCE TO RELATED APPLICATIONS

This application claims the benefit of priority under 35 USC 119 of Japanese patent application no. 2007-182716, filed on Jul. 12, 2007, the entire contents of which are incorporated herein by reference.

BACKGROUND

1. Technical Field

The present invention relates to an image processing apparatus, an image processing method, and a printing apparatus.

2. Related Art

A printing system that executes image mixing processing for mixing a print image as a mixed image from a plurality of frames included in video data is known. For example, in a printing system disclosed in JP-A-2005-284636, a print image is created by detecting deviation (amount of movement) between frames included in video data occurring with the elapse of time and generating a sub pixel on the basis of the amount of movement between the frames.

However, in order to mix the print image while generating sub pixels from a plurality of frames, it is necessary to prepare a storage region with a storage capacity corresponding to several times the data size of a frame. Accordingly, when the number of pixels of a frame is much larger than the data size, mixing of the print image may not be performed with the storage capacity prepared beforehand. In addition, the improvement in image quality obtained by mixing tends to be reduced as the number of pixels of an original frame image increases, that is, as the data size increases.

SUMMARY

An advantage of some aspects of the invention is that it provides an image processing apparatus and method capable of creating a still image with higher image quality from images included in a motion picture by using limited storage capacity.

According to an aspect of the invention, an image processing apparatus that creates a still image from a motion picture including a plurality of images includes: a storage section that has a storage region for correction required when a target image with a predetermined determination size is corrected by using a plurality of images; a size determining section that determines whether or not the size of the target image designated as a still image is equal to or smaller than the determination size; an image extracting section that extracts from the motion picture a plurality of images including a target image designated as a still image and a first image for correction used when performing correction using a plurality of images; and a still image creating section that creates the still image by extracting the plurality of images by means of the image extracting section, and by executing first correction for making a correction using the plurality of images when a result of the determination indicates that the size of the target image is equal to or smaller than the determination size and that creates the still image by extracting only the target image designated as the still image by means of the image extracting section, and by executing second correction for correcting the extracted target image when the determination result indicates that the size of the target image is larger than the determination size.

In the image processing apparatus described above, the storage region for correction required when the target image with the predetermined determination size is corrected by using a plurality of images, it is determined whether or not the size of the target image designated as a still image is equal to or smaller than the determination size, and the still image is created by extracting the plurality of images including the target image designated as the still image and the first image for correction, by means of the image extracting section, and by executing first correction for making a correction using the plurality of images when a result of the determination indicates that the size of the target image is equal to or smaller than the determination size and the still image is created by extracting only the target image designated as the still image by means of the image extracting section, and by executing second correction for correcting the extracted target image when the determination result indicates that the size of the target image is larger than the determination size. Thus, image quality is improved by executing the second correction only on the target image in the case when the size of the target frame is larger than the determination size, that is, in the case of the target frame having a relatively high pixel number and higher image quality is realized by executing the first correction on the target frame using the plurality of images in the case when the size of the target frame is equal to or smaller than the determination size, that is, in the case of the target frame which has a relatively low pixel number and requires larger correction. As a result, a still image with higher image quality can be created from images included in a motion picture by using limited storage capacity. Here, the 'determination size' may be experientially set to an arbitrary size from among sizes allowing a user to realize the effect of an improvement in image quality obtained by performing the first correction. For example, the 'determination size' may be set to the maximum size among the sizes allowing the user to realize the effect.

In the image processing apparatus according to the aspect of the invention, the still image creating section may include: a region setting section that sets a noted pixel from a plurality of pixels of the target image designated as the still image when the determination result indicates that the size of the target image is equal to or smaller than the determination size, sets a region to be corrected that includes the set noted pixel and is corrected on the basis of information on the other pixels, for a part of the target image, and sets a region for correction that is a larger region than the region to be corrected and is used to correct the region to be corrected, for the part of the target image and a part of the first image for correction; a correction determining section that calculates the similarity between the set target image or a region for correction of the first image for correction and the region to be corrected of the set target image in a state where the size of the region for correction is made to match the size of the region to be corrected, and that determines whether or not the region to be corrected is correctable by the region for correction on the basis of the calculated similarity; and a correction executing section that executes the first correction for correcting the region to be corrected by using the region for correction when the determination result indicates that the region to be corrected is correctable by the region for correction. In this manner, the still image is created by correcting one region of the target image on the basis of the similarity using a plurality of images included in a motion picture and one region of the image. As a result, a still image with higher image quality can be created from the images included in the motion picture. In this case, the still image creating section may include an edge determining section that determines whether or not the set noted pixel exists in a predetermined edge region, and the correction executing section may correct the region to be corrected by using the region for correction when the determination result indicates that the region to be corrected is correctable by the region for correction and the set noted pixel exists in the edge region. In this manner, an edge region where the correction effect is high is corrected by using the region for correction. As a result, a still image with higher image quality can be created. Here, the 'predetermined edge region' may be a region corresponding to only an edge of an image or a region including a predetermined range adjacent to the edge of the image. In this case, the still image creating section may create the still image, by correcting the noted pixel of the target image by noise elimination processing using the target image when the set noted pixel does not exist in the edge region. In this manner, noise elimination processing is executed when the noted pixel does not exist in the edge region. As a result, the load of correction processing can be reduced by performing correction with relatively simple processing.

In the image processing apparatus according to the aspect of the invention, the still image creating section may execute at least one of sharpness processing and noise elimination processing as the second correction. In this manner, a still image with higher image quality can be created by sharpness processing or noise elimination processing.

In the image processing apparatus according to the aspect of the invention, when there is an empty region other than the storage region for correction in the storage section, the size determining section may set the determination size on the basis of the storage region for correction and the empty region and determine whether or not the size of the target image designated as the still image is equal to or smaller than the set determination size. In this manner, by using the empty region, a still image with high image quality can be created by performing correction using a plurality of images even when the target frame has a large size.

Furthermore, in the image processing apparatus according to the aspect of the invention, the image extracting section may extract the target image and at least one of images before and after the target image when extracting the plurality of images. In this manner, the target image is corrected by using the first image for correction near the target image. As a result, it becomes easy to improve the image quality of the still image. At this time, a target image and an image immediately after the target image may be extracted or the target image and images immediately before and after the target image may be extracted.

Furthermore, in the image processing apparatus according to the aspect of the invention, the region setting section may set a region of the target image including the region to be corrected as the region for correction when setting the region for correction for the target image, or may set a region that includes a region to be corrected of the first image for correction corresponding to a region to be corrected of the target image, as the region for correction when setting the region for correction for the first image for correction. In this manner, the region for correction is set in a region near the region to be corrected. As a result, it becomes easy to increase the similarity between the region to be corrected and the region for correction and to thus create a still image with high image quality.

According to another aspect of the invention, a printing apparatus includes: the image processing apparatus described above; and a printing executing section that performs processing for printing a still image that is created by the image processing apparatus onto a print medium. Since the printing apparatus prints a still image included in a motion picture in many cases, a still image with higher image quality is required. Accordingly, the scope of application of the invention is high.

According to still another aspect of the invention, an image processing method using an image processing apparatus that creates a still image from a motion picture including a plurality of images and includes a storage section that has a storage region for correction required when a target image with a predetermined determination size is corrected by using a plurality of images and an image extracting section that extracts from the motion picture a plurality of images including a target image designated as a still image and a first image for correction used when performing correction using a plurality of images includes: determining whether or not the size of the target image designated as a still image is equal to or smaller than the determination size; and creating the still image by extracting the plurality of images by means of the image extracting section, and by executing first correction for making a correction using the plurality of images when a determination result obtained in the determining indicates that the size of the target image is equal to or smaller than the determination size and creating the still image by extracting only the target image designated as the still image by means of the image extracting section, and by executing second correction for correcting the extracted target image when the determination result indicates that the size of the target image is larger than the determination size.

In the image processing method described above, the storage region for correction required when the target image with the predetermined determination size is corrected by using a plurality of images, it is determined whether or not the size of the target image designated as a still image is equal to or smaller than the determination size, and the still image is created by extracting the plurality of images including the target image designated as the still image and the first image for correction, by means of the image extracting section, and by executing first correction for making a correction using the plurality of images when a result of the determination indicates that the size of the target image is equal to or smaller than the determination size and the still image is created by extracting only the target image designated as the still image by means of the image extracting section, and by executing second correction for correcting the extracted target image when the determination result indicates that the size of the target image is larger than the determination size. Thus, image quality is improved by executing the second correction only on the target image in the case when the size of the target frame is larger than the determination size, that is, in the case of the target frame having a relatively high pixel number and the higher image quality is realized by executing the first correction on the target frame using the plurality of images in the case when the size of the target frame is equal to or smaller than the determination size, that is, in the case of the target frame which has a relatively low pixel number and requires larger correction. As a result, a still image with higher image quality can be created from images included in a motion picture by using limited storage capacity. In addition, the image processing method may further include realizing a function of the above-described image processing apparatus according to the aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
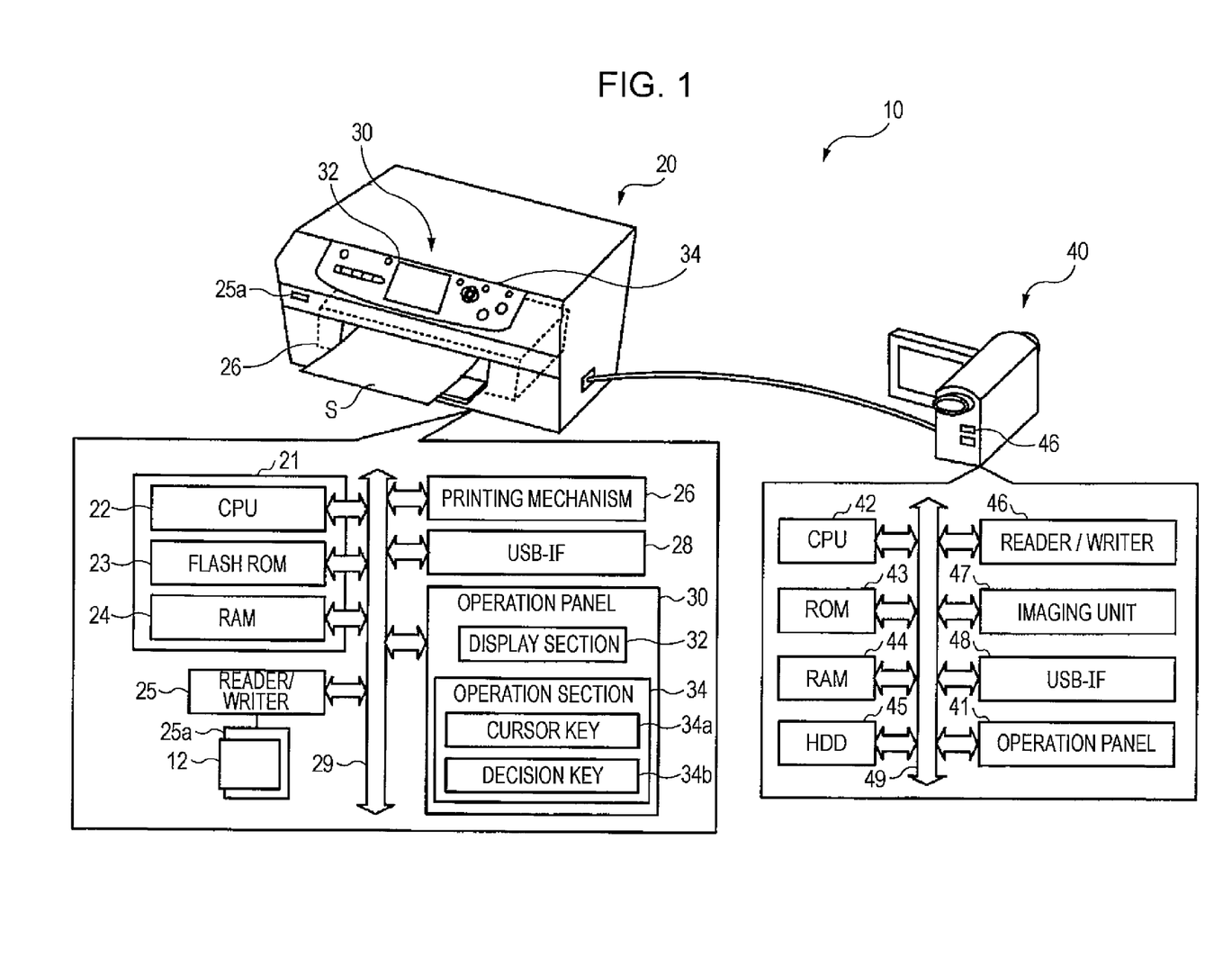
FIG. 1 is a block diagram schematically illustrating the configuration of a printing system.

An embodiment of the invention is now described with reference to the accompanying drawings. FIG. 1 is a block diagram schematically illustrating the configuration of a printing system 10 according to an embodiment of the invention. As shown in FIG. 1, the printing system 10 includes a printer 20 that executes printing by creating a still image from a motion picture and a digital video 40 that can photograph a motion picture and transmit the photographed motion picture to the printer 20.

The printer 20 includes: a controller 21 that performs overall control of the apparatus; a reader/writer 25 that can attach/detach a portable storage medium such as a memory card 12 to/from a slot 25a; a printing mechanism 26 that prints an image onto recording paper S; a USB interface (USB I/F) 28 that allows information to be input from a connected external device or information to be output to the connected external device; and an operation panel 30 on which information to a user can be displayed and to which a user's instruction can be input. The controller 21, the reader/writer 25, the printing mechanism 26, the USB I/F 28, and the operation panel 30 are electrically connected by a bus 29. The controller 21 is configured as a microprocessor mainly using a CPU 22 and includes a flash ROM 23 that stores and removes information and stores various kinds of processing programs therein, and a RAM 24 that temporarily stores data therein. Although not shown, the printing mechanism 26 is an ink jet type mechanism that executes printing processing by applying pressure to ink corresponding to each color and discharging the pressed ink onto the recording paper S. In addition, the mechanism may use deformation of a piezoelectric element or generation of bubbles caused by heat of a heater. The operation panel 30 is used when a user inputs various kinds of instructions to the printer 20 and includes a display section 32 including a color liquid crystal panel, on which characters or images corresponding to various kinds of instructions are displayed, and an operation section 34 that performs various kinds of operations. A cursor key 34a pressed when a user moves a cursor that selects processing, a character, or the like, and/or a decision key 34b pressed when the user decides processing selection or the like is disposed in the operation section 34. The memory card 12 is a nonvolatile memory capable of writing data thereinto and removing data therefrom and stores a plurality of image files photographed by a photographing apparatus, such as the digital video 40, therein.

The digital video 40 includes: a CPU 42 that executes various kinds of control; a ROM 43 that stores various kinds of processing programs therein; a RAM 44 that temporarily stores data therein; an HDD 45 serving as a memory with a large capacity; a reader/writer 46 to which a memory card (not shown) is attached, from which information can be read, and into which information can be written; an imaging unit 47 that converts incident light into an electrical signal by the use of an imaging element and creates a video file or a still image file; a USB I/F 48 that allows information to be input from or output to a connected external device; and an operation panel 41 on which information can be displayed and to which a user's instruction can be input. Video data or still image data photograph by the imaging unit 47 is stored in the HDD 45. The imaging unit 47 creates image data of a motion picture or a still image by receiving electrical signals, which are obtained by dividing light incident from an imaging element (for example, a CCD or a CMOS) into colors of red (R), green (G), and blue (B) and performing known image processing (for example, white balance processing or gamma processing) on input data.

Figure 2:
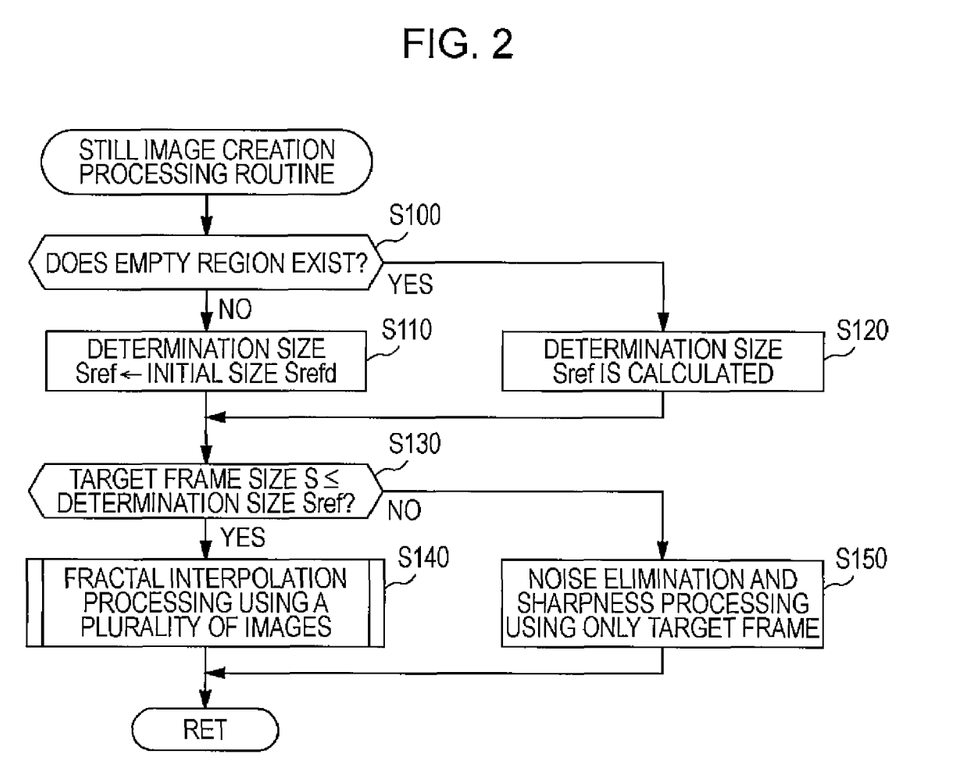
FIG. 2 is a flow chart illustrating an example of a still image creation processing routine.
Figure 3A:
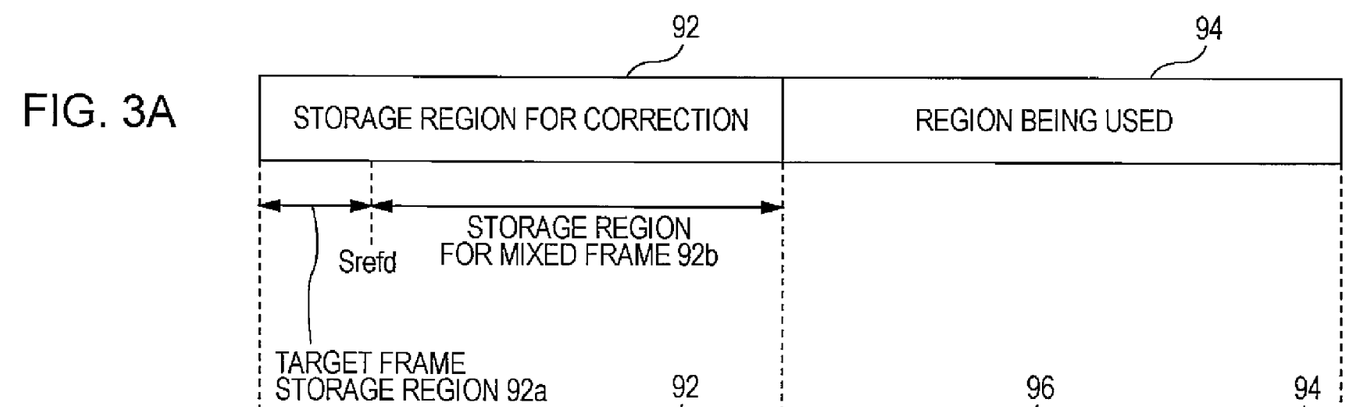
FIGS. 3A and 3B are explanatory views illustrating a storage region of a RAM.
Figure 3B:
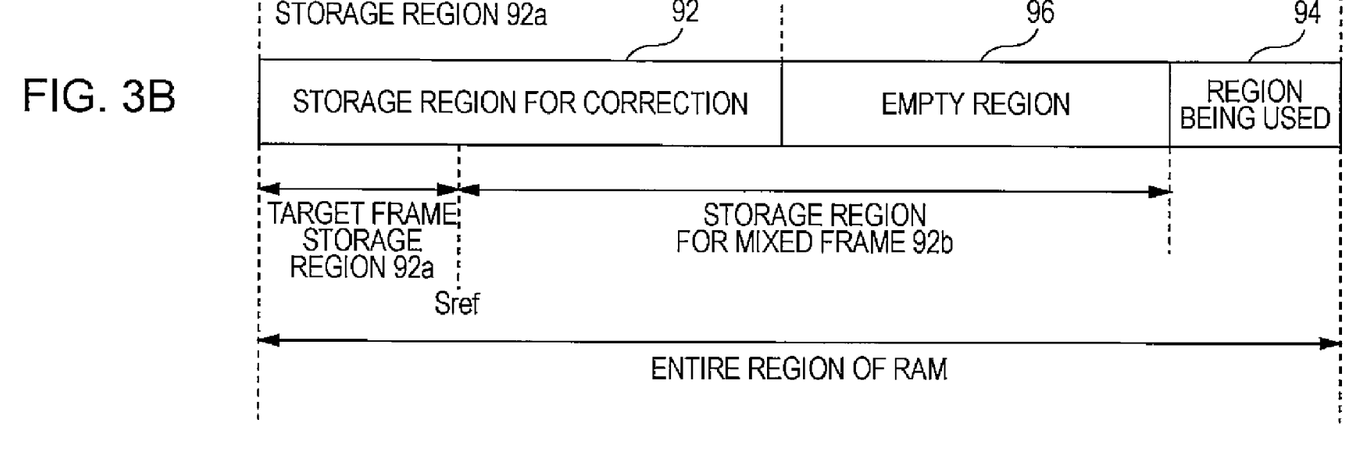

Next, an operation of the printing system 10 according to the embodiment described above and in particular, an operation of the printer 20 for creating a still image from video data stored in the HDD 45 of the digital video 40, is described. First, a user connects the digital video 40 and the printer 20 to each other with a USB cable 40a, operates the operation panel 30 of the printer 20, selects processing for creating a still image from a motion picture on a processing selection screen displayed on the display section 32, and selects desired video data. Then, CPU 22 causes video data, which is stored in the HDD 45 of the digital video 40 and in which a target still image is included, to be input through the USB cable 40a and to be reproduced on the display section 32. The user designates a still image to be created by pressing the decision key 34b on a scene from among images displayed on the display section 32. Then, the CPU 22 executes the following processing in order to create the still image from a frame (image; hereinafter, referred to as a 'target frame') of the designated video data. FIG. 2 is a flow chart illustrating an example of a still image creation processing routine executed by the CPU 22 of the printer 20, and FIGS. 3A and 3B are views explaining a storage region of the RAM 24. The still image creation processing routine is stored in the flash ROM 23 and is executed after the user operates the operation panel 30 to designate a frame displayed on the display section 32 as a still image.

When the routine is executed, the CPU 22 first determines whether or not an empty region exists in the RAM 24 (step S100). When it is determined that there is no empty region, a determination size Sref is set as an initial size Srefd (step S110). On the other hand, when it is determined that there is an empty region, the determination size Sref is set in consideration of the empty region (step S120). Here, a storage region of the RAM 24 and the determination size Sref will be described. The printer 20 is set such that correction processing for improving the image quality by correcting a target frame only with the target frame and correction processing (here, fractal interpolation processing) for improving the image quality by correcting the target frame using a plurality of frames including the target frame and frames (hereinafter, referred to as 'mixing frames') other than the target frame, which will be described in detail later. The determination size Sref is dynamically set as a threshold value for determining whether or not the target frame can be corrected using a plurality of frames. As shown in FIG. 3A, a storage region of the RAM 24 includes a storage region for correction 92, which is a region secured to correct a target frame designated as a still image, and a region being used 94 to which a program under execution is loaded or which is secured by a printing buffer or the like. The storage region for correction 92 is used as a target frame storage region 92a, in which a target frame is stored, and a storage region 92b for a mixed frame and the like, in which a plurality of mixing frames or frames after mixing are stored, when processing for correcting a target frame by using a plurality of frames, specifically, fractal interpolation processing (to be described later), is executed. Here, by experientially calculating the image quality when correcting a target frame with a plurality of frames, the target frame is set to be corrected by using the target frame and two mixing frames. Accordingly, the initial size Srefd is set to a value calculated as a maximum storage capacity, which can be assigned for one frame, by reducing the storage capacity that is required for storing a created still image, and the storage capacity for a correction work from the storage capacity of the storage region for correction 92, and then dividing the result by the total number (three sheets) of target frames and mixing frames, that is, the size of the target frame storage region 92a shown in FIG. 3A. In addition, when there is a free space in the region being used 94, the storage region of the RAM 24 is configured to include the storage region for correction 92, the region being used 94, and an empty region 96 as shown in FIG. 3B. In this case, a region obtained by adding the storage region for correction 92 and the empty region 96 is set as a region used for correction of the target frame. Moreover, in a procedure of calculating the initial size Srefd, the determination size Sref is dynamically set by a procedure in which the storage capacity obtained by adding the storage capacity of the storage region for correction 92 and the storage capacity of the empty region 96 is used instead of the storage capacity of the storage region for correction 92. Therefore, in the case when there is an empty region, the determination size Sref is set larger than the initial size Srefd, such that correction using a plurality of frames can be made even if the target frame has a larger size. Subsequently, it is determined whether or not the size S of the target frame is equal to or smaller than the determination size Sref (step S130). When the size S of the target frame is equal to or smaller than the determination size Sref, it is necessary to make a large correction of the target frame. Accordingly, a still image is created by performing fractal interpolation processing using three images including the target frame (step S140), and the routine is completed. On the other hand, when the size S is larger than the determination size Sref, there is no storage capacity required for correction using three frames. Accordingly, a still image is generated by performing sharpness processing and noise elimination processing on the target frame using only the target frame (step S150), and the routine is completed. In addition, the storage capacity required for fractal interpolation processing is several times (for example, four times) or more the storage capacity required for correction using only a target frame. In practice, even in the case where the fractal interpolation processing cannot be performed, a correction using only a target frame may be performed.

Thus, the still image is generated by setting the determination size Sref according to the empty region 96 and then performing correction using a plurality of frames when the size S is equal to or smaller than the determination size Sref and performing correction using only the target frame when the size S is larger than the determination size Sref. Accordingly, when there is an empty region, even in the case of a target frame exceeding the initial size Srefd, a still image with a higher quality is generated by using a plurality of frames according to the empty region.

Figure 4:
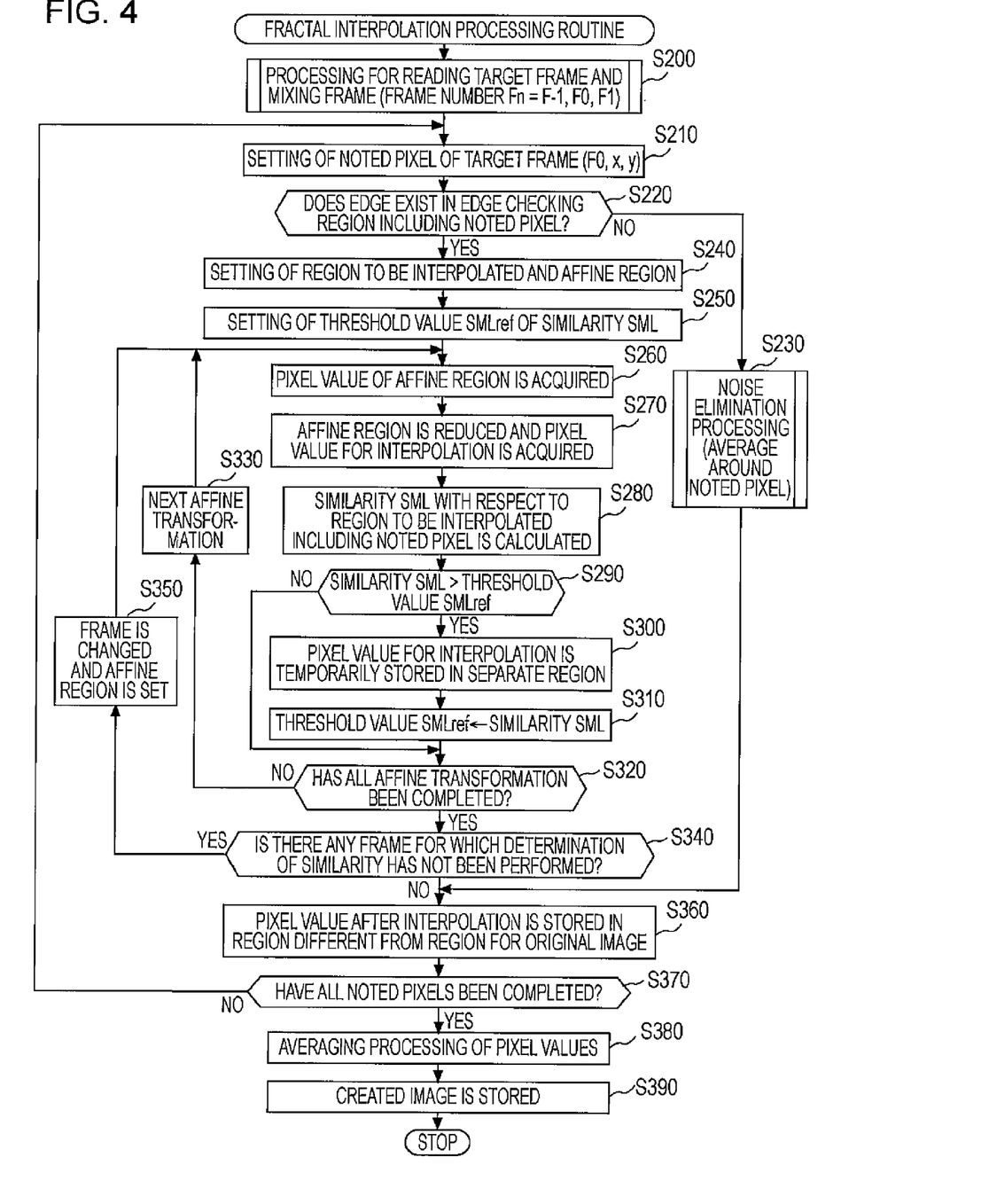
FIG. 4 is a flow chart illustrating an example of a fractal interpolation processing routine.
Figure 5:
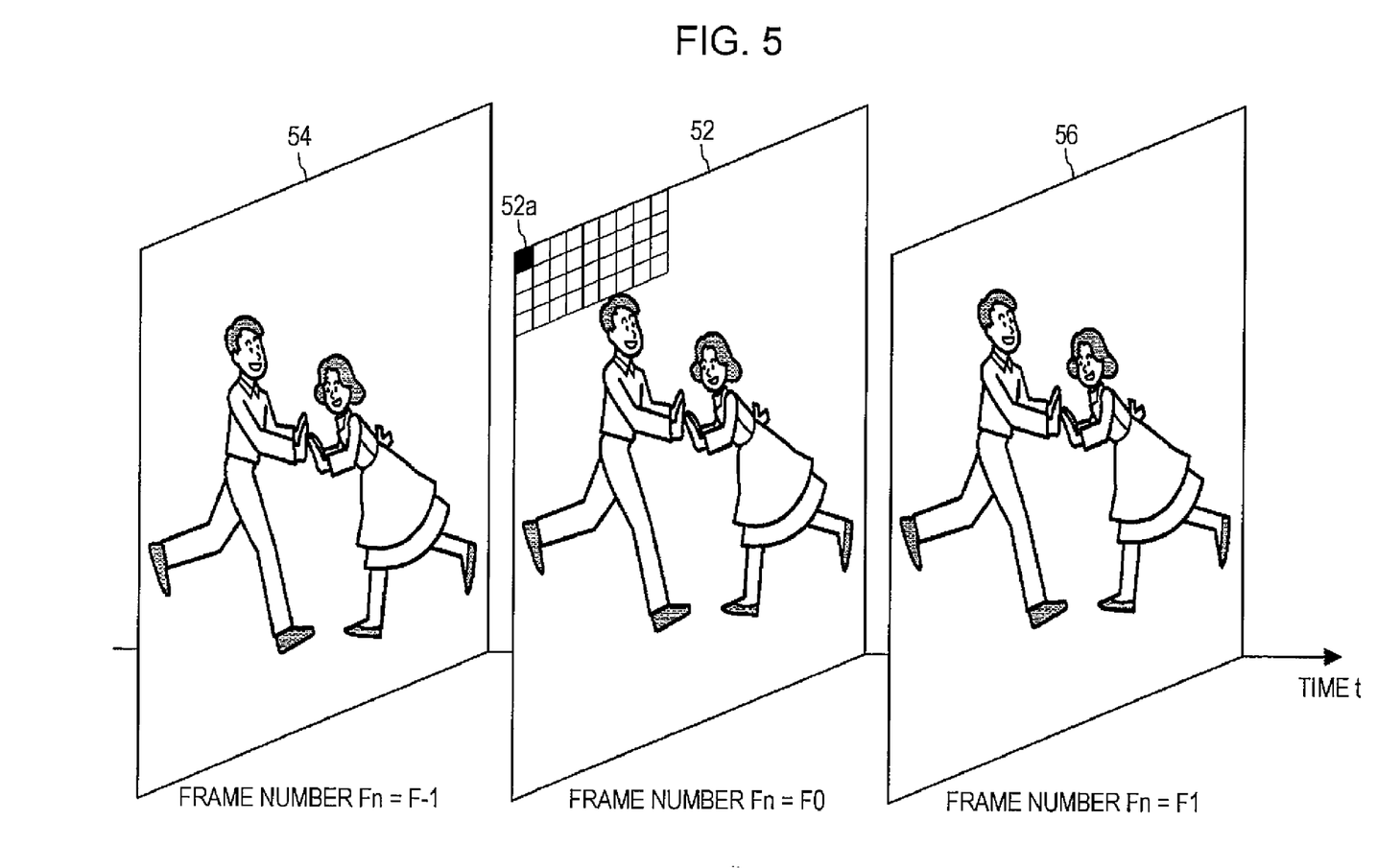
FIG. 5 is an explanatory view illustrating a target frame and a mixing frame.

Fractal interpolation processing for interpolating a region to be interpolated in a region with higher similarity than the region is now described. FIG. 4 is a flow chart illustrating an example of a fractal interpolation processing routine. When the fractal interpolation processing routine is executed, the CPU 22 reads a target frame, which is designated as a still image, and frames immediately before and after the target frame as mixing frames used for interpolation of the target frame, and stores the read frames in the RAM 24 (step S200). FIG. 5 is an explanatory view illustrating a target frame and a mixing frame. Here, the number of mixing frames suitable for correction of a target frame is experientially calculated. As shown in FIG. 5, when the frame number Fn of the target frame 52 is set to F0, two frames including a previous frame 54 having the frame number F-1 and a next frame 56 having the frame number F1 are used. Then, the CPU 22 sets a noted pixel as a pixel for interpolating the target frame 52 (step S210). Here, a noted pixel is set such that in a state where an upper left pixel of the target frame 52 is set as the initial position (x, y), the position of a pixel is moved toward the right side whenever processing is repeated and then the position of the pixel is moved from a left-end pixel on a next row toward the right end when the position of the pixel reaches a right end.

Figure 6:
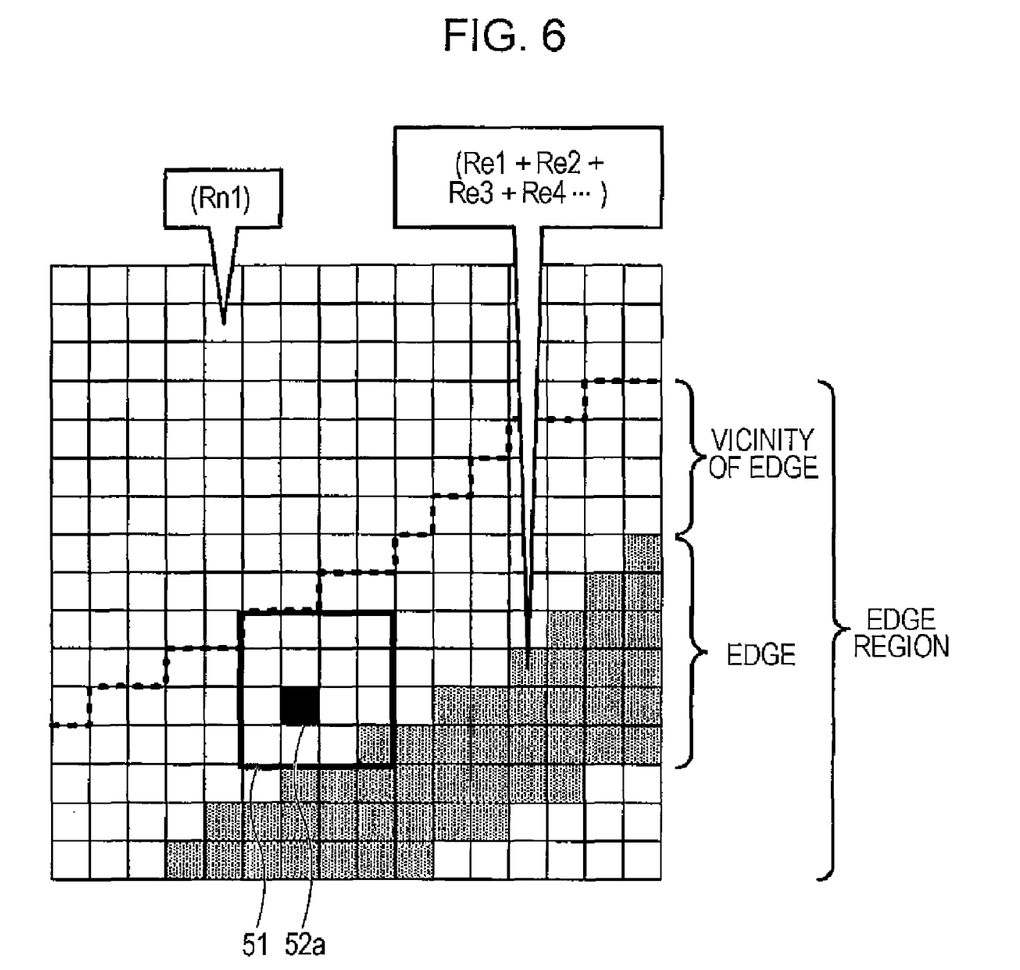
FIG. 6 is an explanatory view illustrating an edge region.

Then, the CPU 22 determines whether or not an edge exists in an edge checking region including the noted pixel (step S220). FIG. 6 is an explanatory view illustrating an edge region. Here, it is assumed that an edge and a near-edge region positioned within a predetermined range (for example, a pixel range of 4×4 pixels) from the edge are set as an edge region and fractal interpolation using a plurality of frames is executed when a noted pixel 52a is included in the edge region. In this manner, the image quality can be effectively improved as compared with a case in which fractal interpolation is performed only on the edge. Determination of whether or not the edge exists in an edge checking region 51 is performed by providing edge detection filters that detect edges in vertical, horizontal, and inclined directions in a target region. In addition, the edge checking region 51 is set to be larger than a region to be interpolated 52b (refer to FIG. 7).

Interpolation (mixing) of the target frame 52 is now described. In the present embodiment, fractal interpolation is executed on a region to be interpolated including a noted pixel when the noted pixel is included in an edge region of an image and noise elimination processing is executed on the noted pixel when the noted pixel is not included in the edge region of the image. In general, the natural shape has a fractal structure in which the shape of an image included in a local region (referred to as a 'region to be interpolated') is a reduction of the shape of an image included in a region (referred to as an 'affine region') which is similar to the local region and is larger than the local region. Here, an interpolation method of reducing the shape of an image included in an affine region according to a region to be interpolated and then making the region to be interpolated in a more natural shape to obtain high resolution by performing processing in a concept that an image in the region to be interpolated is replaced with the reduced image when the shape of the reduced image is similar to the shape of the image included in the region to be interpolated is called fractal interpolation.

However, when it is determined that there is no edge in the edge checking region including the noted pixel in step S220, noise elimination processing is executed on the noted pixel (step S230). The noise elimination processing calculates the average of a value of the noted pixel and values of pixels around the noted pixel. The calculated average pixel value is stored in a different region from the region of the RAM 24 where an original image is stored (refer to 'Rn1' shown in FIG. 6). Thus, when the noted pixel 52a is positioned outside the edge region, the noted pixel 52a is compensated by using only a partial region of the target frame 52.

Figure 7:
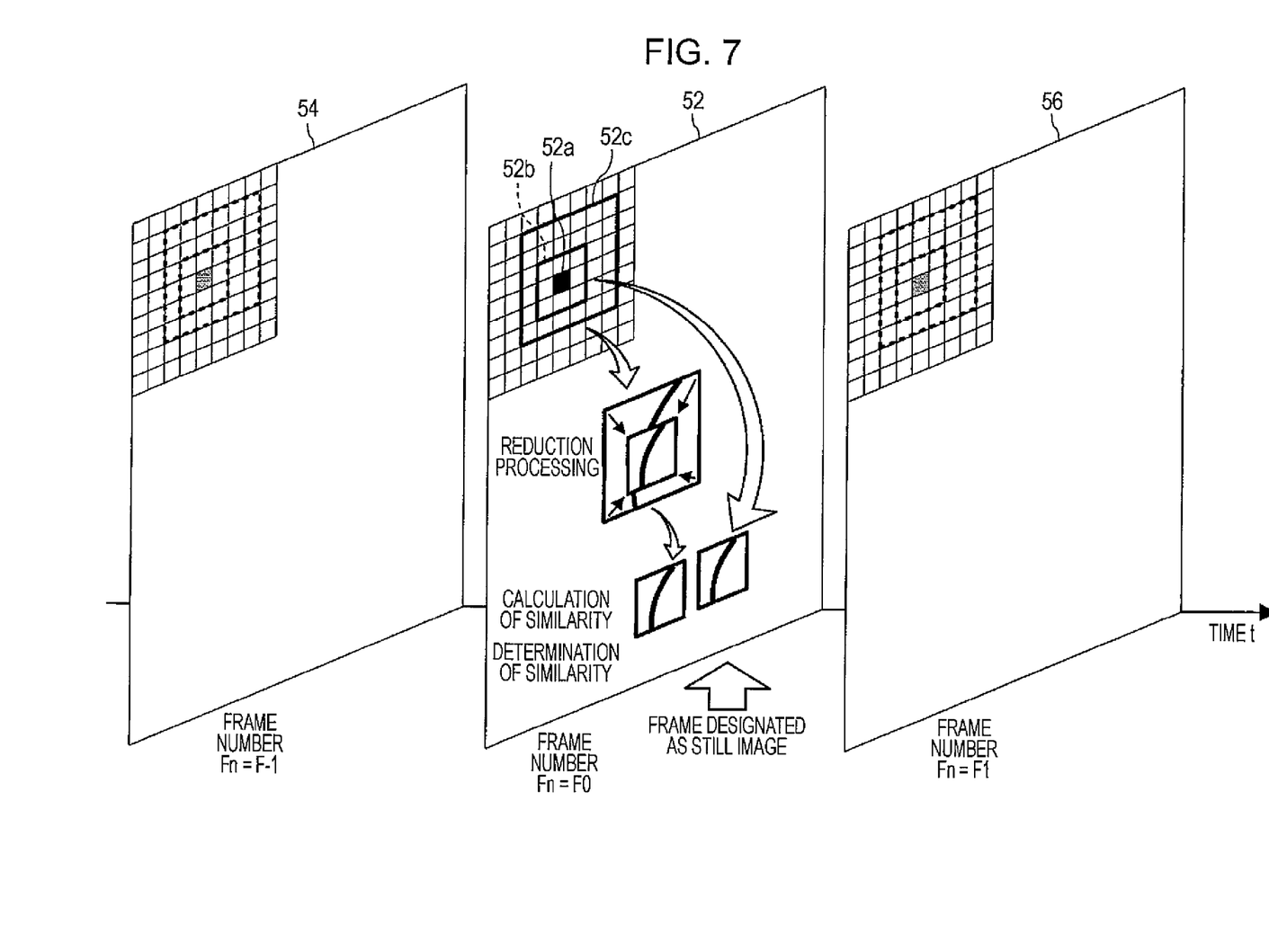
FIG. 7 is an explanatory view illustrating fractal interpolation.
Figure 8A:
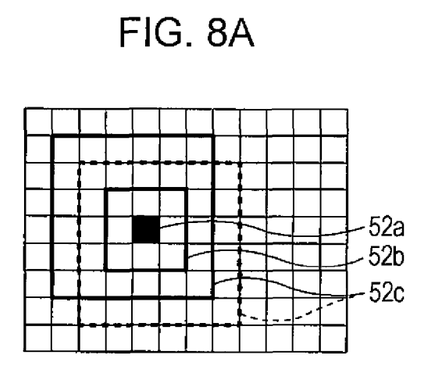
FIGS. 8A to 8D are explanatory views illustrating an example of an outline of affine transformation of an affine region.
Figure 8B:
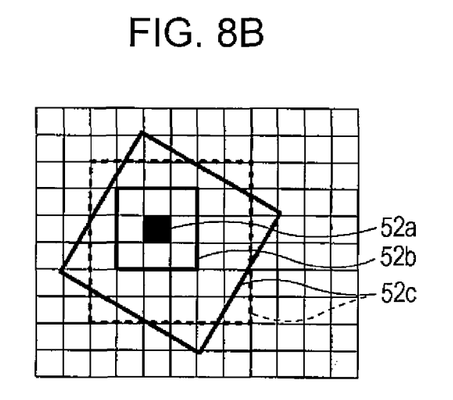
Figure 8C:
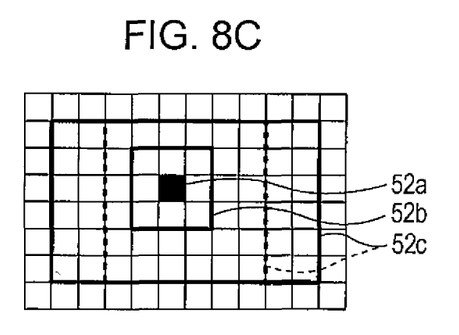
Figure 8D:
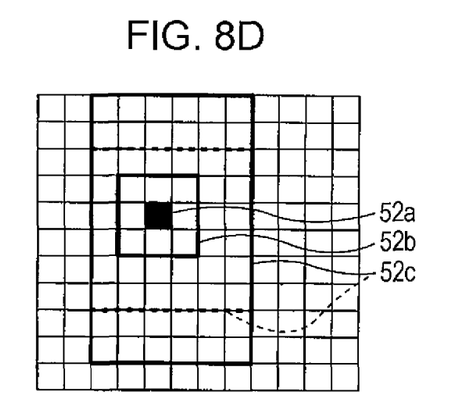

On the other hand, when it is determined that an edge exists in the edge checking region including a noted pixel in step S220, the fractal interpolation processing is executed on the region to be interpolated 52b (refer to FIG. 7) including the noted pixel 52a. Specifically, as shown in FIG. 7, the region to be interpolated 52b including the noted pixel 52a is set, and an affine region 52c larger than the region to be interpolated 52b, which is used to correct the region to be interpolated 52b, is set (step S240). FIG. 7 is an explanatory view illustrating fractal interpolation. The region to be interpolated 52b may be set to correspond to a predetermined number of pixels (for example, 3×3 pixels or 4×4 pixels) around the noted pixel 52a. In addition, the affine region 52c may be set to correspond to multiples (for example, twice or 2.5 times) of the region to be interpolated 52b. Here, the region to be interpolated 52b is set as a pixel region of 3×3 pixels, and the affine region 52c is set as a pixel region of 6×6 pixels corresponding to four times the region to be interpolated 52b. The affine region 52c is set as a region including the noted pixel 52a and the region to be interpolated 52b of the target frame 52 in the beginning stage of image mixing processing.

Then, the CPU 22 sets a threshold value SMLref of similarity SML (step S250). The similarity SML is a value used to determine whether or not processing in a concept that a region of the region to be interpolated 52b is replaced with a region obtained by reducing the affine region 52c is executed, that is, whether or not fractal interpolation is executed. An initial value of the threshold value SMLref is assumed to be set to a value obtained experientially when the image quality is improved more than the original image by executing interpolation of the noted pixel 52a. Then, the CPU 22 reads each pixel value of the set affine region 52c (step S260) and acquires a pixel value for interpolation, which is used to interpolate each pixel value of the region to be interpolated 52b, by reducing the affine region 52c so as to match the size of the region to be interpolated 52b (step S270). Then, the similarity SML indicating the similarity of each pixel value (pixel value for interpolation) of the reduced affine region 52c with respect to the region to be interpolated 52b including the noted pixel 52a is calculated (step S280). Here, the square mean of a difference between each pixel value of the region to be interpolated 52b and each pixel value for interpolation is calculated, and then the similarity SML is calculated to be a larger value as a total sum of the square mean of the difference is smaller, that is, to be a larger value as the similarity is high.

Then, the CPU 22 determines whether or not the calculated similarity SML exceeds the threshold value SMLref, that is, whether or not the similarity between the image shape of the region to be interpolated 52b and the image shape of the reduced affine region 52c is high (step S290). When the similarity SML exceeds the threshold value SMLref, the image shape of the region to be interpolated 52b and the image shape of the reduced affine region 52c are determined to be similar to each other and each pixel value for interpolation is temporarily stored in a predetermined region of the RAM 24 (step S300), and then the calculated similarity SML is set as the threshold value SMLref (step S310). In addition, since the region to be interpolated 52b is set to be interpolated by using a pixel value for interpolation most approximating the region to be interpolated 52b, the threshold value SMLref is changed to the similarity SML, which is a more similar value, and the pixel value for interpolation is overwritten to a more similar value.

After step S310, or if the similarity SML does not exceed the threshold value SMLref in step S290, that is, if the similarity is low and the affine region 52c is not adopted as an interpolation pixel of the region to be interpolated 52b, the CPU 22 determines whether or not the following affine transformation of the affine region 52c has been completed (step S320). FIGS. 8A to 8D are explanatory views illustrating an example of the outline of affine transformation of the affine region 52c. Here, an image most similar to the image shape included in the region to be interpolated 52b is obtained by performing various kinds of affine transformation on the affine region 52c. In the present embodiment, for example, processing for moving the affine region 52c by a predetermined range so as to be parallel in the left, right, upper, or lower directions (FIG. 8A), processing for rotating the affine region 52c by a predetermined angle (FIG. 8B), processing for extending the affine region 52c in the horizontal direction (FIG. 8C), and processing for extending the affine region 52c in the vertical direction (FIG. 8D) are set to be performed in order. Thus, various affine regions 52c are set and a pixel for interpolation which is optimal for the region to be interpolated 52b is searched. In addition, when all affine transformation of the affine region 52c is not completed, the affine region 52c which has been subjected to the next affine transformation according to the above-described order is set (step S330), and processing starting from step S260, that is, processing for determining whether or not the shifted affine region 52c is more similar to the region to be interpolated 52b, is repeated.

Figure 9:
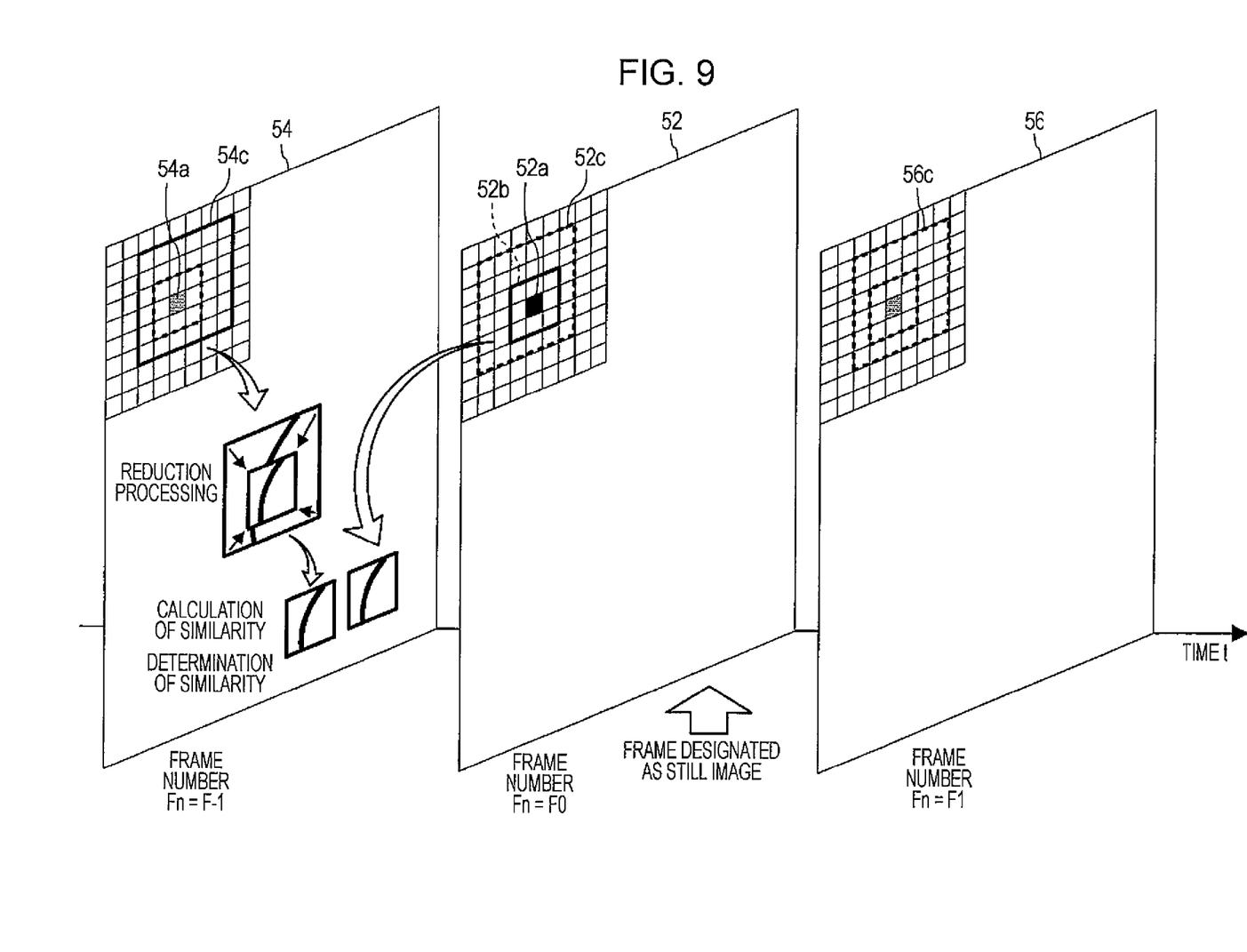
FIG. 9 is an explanatory view illustrating fractal interpolation.

On the other hand, when all the affine transformation of the affine region 52c is completed, the CPU 22 determines whether or not there is a frame for which determination of the similarity SML has not been performed (step S340). When it is determined that there is a frame for which determination of the similarity SML has not been performed, the CPU 22 changes a noted frame used for fractal interpolation, for example, from the target frame 52 to the previous frame 54, and sets an affine region of the changed frame (step S350), and then processing starting from step S260, that is, processing for determining whether or not the affine region 54c of the previous frame 54 or the affine region 56c of the next frame 56 is more similar to the region to be interpolated 52b, is repeated. For example, as shown in FIG. 9, in the case when the noted frame has been changed to the previous frame 54, the coordinate of the previous frame 54 equal to the coordinate of the noted pixel 52a of the target frame 52 is set to a temporary noted pixel 54a and the affine region 54c including the temporary noted pixel 54a is set in the same manner as described above. That is, the affine region is set in a pixel range substantially including the noted pixel 52a or the region to be interpolated 52b.

When it is determined that there is no frame for which determination of the similarity SML has not been performed (all frames have been determined) in step S340, the CPU 22 stores a pixel value for interpolation which is temporarily stored in a predetermined region of the RAM 24 currently, that is, a pixel value for interpolation, which most approximates the set region to be interpolated 52b, in the RAM 24 by adding the pixel value for interpolation to the corresponding coordinate on a sheet provided in the storage region 92a, such as a mixed frame, of the RAM 24 (step S360). For example, when the noted pixel 52a is changed to a neighboring pixel, the region to be interpolated 52b overlaps the previous region. However, a value of fractal interpolation is herein averaged by integrating pixel values for correction and performing division using the integrated number. When a pixel value for interpolation is not temporarily stored, the region to be interpolated 52b of the original image is stored on the sheet.

Figure 10A:
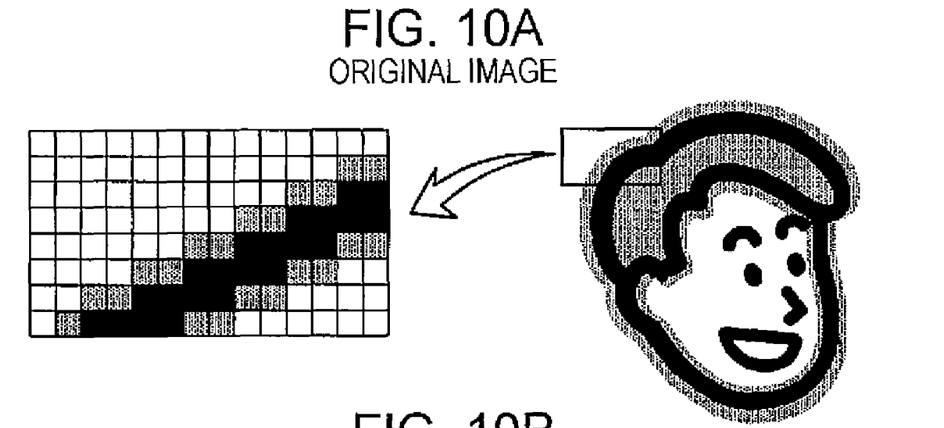
FIGS. 10A to 10C are explanatory views illustrating the image quality of still images before and after performing interpolation processing.
Figure 10B:
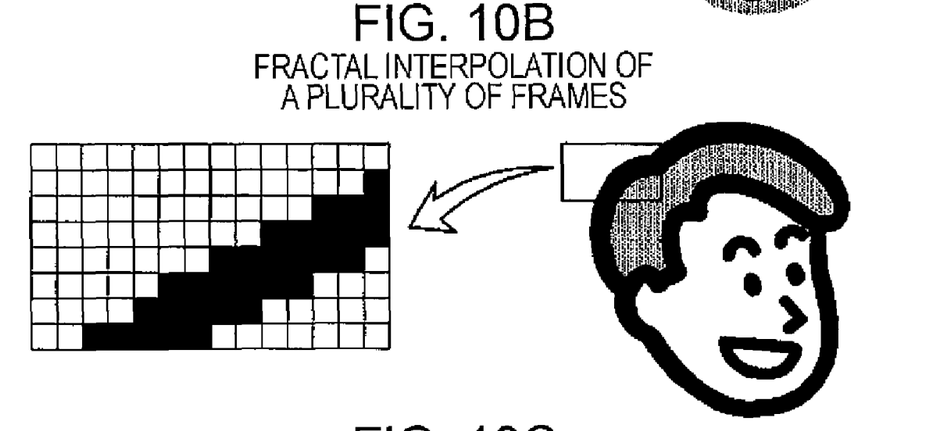
Figure 10C:
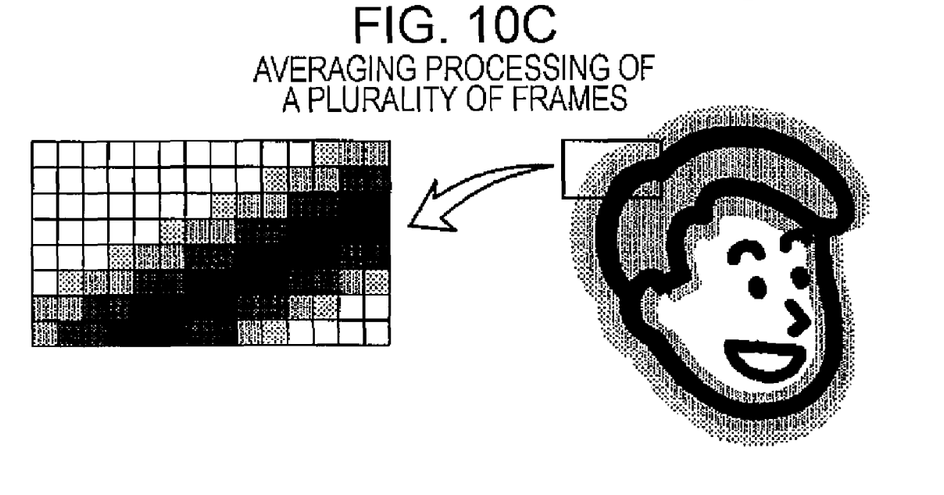

Subsequently, the CPU 22 determines whether or not all the noted pixels 52a have been completed (step S370). When it is determined that all the noted pixels 52a are not completed, the CPU 22 sets the next noted pixel 52a in step S210 and repeats processing starting from step S220. In addition, when it is determined that all the noted pixels 52a have been completed, pixel values are averaged by performing division using a number obtained by integrating the pixel values (step S380). Then, a still image is created by performing smoothing processing of an edge region, and the created still image is stored in a storage place, such as the memory card 12, set beforehand (step S390), and the routine is completed. FIGS. 10A to 10C are views explaining the image quality of still images before and after performing interpolation processing. In the case when still images are mixed in a method of averaging pixel values of frames in a state where deviation of all of the plurality of frames is corrected by using the plurality of frames including an original image (FIG. 10A) of video data with a blurred edge, an image with a blurred edge and without the movement of a photographic subject is obtained as shown in FIG. 10C. When sharpness processing or the like is performed to modify the result, noise is also emphasized. As a result, the obtained image quality is not often sufficient even though the image quality is improved. In the present embodiment, an image with a clear edge is obtained by sufficiently improving the image quality without performing sharpness processing or gamma processing, for example, by executing fractal interpolation using a plurality of frames including the original image (FIG. 10A) of video data (FIG. 10B). In addition, for example, processing for printing the still image may also be performed by the printing mechanism 26 after creating the still image.

The correspondence relationship between constituent components of the present embodiment and constituent components of the invention will now be clarified. The printer 20 of the present embodiment is equivalent to an image processing apparatus of the invention and the controller 21 is equivalent to a size determining section, an image extracting section, a still image generating section, a region setting section, a correction determining section, a correction executing section, and an edge determining section. The RAM 24 is equivalent to a storage section, the printing mechanism 26 is equivalent to a printing executing section, the fractal interpolation processing shown in FIG. 4 is equivalent to first correction, and processing in step S140 of still image creating processing shown in FIG. 2 is equivalent to second correction processing. In addition, the target frame 52 is equivalent to a target image, the mixing frame, the previous frame 54, and the next frame 56 are equivalent to first images for correction, the region to be interpolated 52b is equivalent to a region to be corrected, the affine region 52c is equivalent to a region for correction, and the recording paper S is equivalent to a print medium. Moreover, in the present embodiment, an example of the image processing method of the invention is also clarified by describing the operation of the printer 20.

According to the printer 20 of the present embodiment described above, image quality is improved by executing sharpness processing and noise elimination only on a target frame in the case when the size S of the target frame is larger than the determination size Sref, that is, in the case of the target frame having a relatively high pixel number and the higher image quality is realized by executing fractal interpolation processing on a target frame using the target frame and a mixing frame in the case when the size S of the target frame is equal to or smaller than the determination size Sref, that is, in the case of the target frame that has a relatively low pixel number and requires larger correction. Therefore, from the frame included in video data, a still image with higher image quality can be created by using a limited storage capacity.

In addition, a plurality of images of the target frame 52 designated as a still image and a mixing frame used for mixing are extracted, the noted pixel 52a of the target frame 52 is set, the region to be interpolated 52b as an object to be corrected is set for a region including the noted pixel 52a of the target frame 52, the affine regions 52c, 54c, and 56c which are larger regions than the region to be interpolated 52b and substantially includes the region to be interpolated 52b are set for the target frame 52 and the mixing frame, the similarity SML of the region to be interpolated 52b and regions obtained by reducing the set affine regions 52c, 54c, and 56c of the target frame 52 or the mixed frame is calculated, and fractal interpolation of the region to be interpolated 52b is performed by using any one of the affine regions 52c, 54c, and 56c on the basis of the determination result using the calculated similarity SML, thereby creating a still image. Accordingly, the still image is created by performing fractal interpolation of the target frame 52 on the basis of the similarity SML using one region of the frame while using a plurality of frames included in video data. As a result, a still image with higher image quality can be created from an image included in video data. Furthermore, since the affine regions 52c, 54c, and 56c are set in the region substantially including the noted pixel 52a, it is easy to increase the similarity between the region to be interpolated 52b and the affine regions 52c, 54c, and 56c and to create a still image with high image quality. Furthermore, since fractal interpolation is executed when the noted pixel 52a exists in an edge region, the edge region where the correction effect is high is corrected by using a region for correction. Accordingly, a still image with higher image quality can be created. In addition, since noise elimination processing is executed by using only the target frame 52 when the noted pixel 52a does not exist in the edge region, the load of interpolation processing can be reduced by performing interpolation with relatively simple processing. In addition, since a pixel value of each pixel is set by adding correction pixel values obtained by reducing the region for correction, the edge region can be made to have high image quality in a relatively uniform state. In addition, since an interpolation result is stored in a region of the RAM 24 different from a region for the target frame, the target frame can be used later. In addition, since the target frame 52 and images before and after the target frame 52 are extracted, it is easy to improve the image quality of a still image by performing fractal interpolation using a mixing frame close to the target frame 52. In addition, since the sharpness processing and the noise elimination processing are executed when the size of the target frame is larger than the determination size, a still image with higher image quality can be created by the sharpness processing and the noise elimination processing. In addition, when there is an empty region in the memory 24, the determination size for execution is set from a storage region for correction and the empty region, and it is determined whether or not the size of the target frame designated as a still image is equal to or smaller than the determination size for execution. Thus, by using the empty region, a still image with high image quality can be created by performing correction using a plurality of images even in the case of the target frame having a large size. In addition, since the printer 20 prints a still image included in a motion picture in many cases, a still image with higher image quality is required. Accordingly, the scope of application of the invention is high.

The invention is not limited to the above-described embodiment, and various modifications may be made without departing from the technical scope of the invention.

For example, in the embodiment described above, when the size S of the target frame is equal to or smaller than the determination size Sref, the still image is created by performing fractal interpolation only for the edge region and performing sharpness processing and noise elimination processing for the other regions. However, as long as a still image is created by using a plurality of frames including a target frame, the still image may also be created by performing any kind of interpolation or correction. For example, fractal interpolation processing may be performed on all the pixels of the target frame regardless of the edge region. Alternatively, a still image having a large number of pixels may be created by correcting the positional relationship of all of the plurality of frames on the basis of the contents (for example, an edge portion) of an image of each frame with performing fractal interpolation, mixing images with a larger number of pixels than the pixel number of the original frame while interpolating the images, and then performing sharpness processing and noise elimination processing. This mixing processing is disclosed in detail in JP-A-2005-284636, for example. Even in this case, a still image with higher image quality can be created from the frame included in video data by using the limited storage capacity.

In the embodiment described above, the determination size Sref is dynamically set according to the empty region 96. However, the determination size Sref may also be set to the initial size Srefd regardless of the empty region 96. In this case, in the still image processing routine shown in FIG. 2, the processing in step S110 is performed without performing the processing in step S100 after the routine is started. Even in this case, a still image with higher image quality can be created from the frame included in video data by using the limited storage capacity. In this case, for example, the RAM 24 may have only a storage region for correction and a RAM that performs processing, such as printing, may be provided separately from the RAM 24.

In the embodiment described above, three frames including frames before and after a target frame are read when reading three frames at the time of correction. However, any frame may be read as long as the target frame is included. For example, three frames including first and second frames after a target frame may be read, or three frames including first and second frames before the target frame may be read, or three frames including a second frame before the target frame and a second frame after the target frame may be read. Alternatively, two frames including a target frame and any one of frames before and after the target frame may be read. Even in this case, a still image with higher image quality can be created from the frame included in video data by using the limited storage capacity. In addition, the storage region for correction secured beforehand in the RAM 24 is set according to the number of frames read.

In the embodiment described above, sharpness processing and noise elimination processing are performed when the size S of a target frame is larger than determination size Sref. However, any kind of correction processing performed by using only a target frame may also be applied. For example, only one of sharpness and noise elimination processing may also be performed.

Even though an edge region includes a region near the edge in the embodiment described above, the edge region may not include the region near the edge.

In the embodiment described above, processing for moving the affine region 52*c* by a predetermined range so as to be parallel in the left, right, upper, or lower directions, processing for rotating the affine region 52*c* by a predetermined angle, processing for extending the affine region 52*c* in the horizontal direction, and processing for extending the affine region 52*c* in the vertical direction are performed as the affine transformation of the affine region 52*c*. However, the invention is not limited thereto. For example, processing for change to a rhombus may be added, or one or more of the above-described processings may be omitted. Even in this case, a still image with higher image quality can be created from an image included in a motion picture.

In the embodiment described above, the average of surrounding pixels is taken as noise elimination processing in regions other than the edge region. However, in the regions other than the edge region, processing for providing a noise elimination filter or smoothing processing may also be executed. Alternatively, no processing may be performed in the regions other than the edge region.

In the embodiment described above, the similarity SML is calculated by reducing the affine region 52*c* so as to match the size of the region to be interpolated 52*b*. However, the similarity SML may also be calculated without reducing the affine region 52*c*. Furthermore, in the embodiment described above, a still image is created by executing interpolation processing in a concept that the affine region 52*c* is reduced to be replaced for the region to be interpolated 52*b*. However, the still image may also be created by executing interpolation processing according to the size of the affine region 52*c* without reducing the affine region 52*c*.

In the embodiment described above, the region to be interpolated 52*b* or the affine region 52*c* is set in a region where the noted pixel 52*a* is substantially included. However, an affine region where the noted pixel 52*a* is not substantially included, such as the previous frame 54 or the next frame 56, may also be set. Even in this case, a still image with higher image quality can be created from an image included in a motion picture since fractal interpolation is executed by using the high similarity SML.

In the embodiment described above, video data is stored in the HDD 45 without performing compression processing. However, the video data may be stored after processing for compression to a predetermined compression format (for example, MPEG-2) is performed. In this case, processing for decompressing a target frame or the like is executed together when reading the target frame from the HDD 45.

In the embodiment described above, video data which is a source of a created still image is stored in the HDD 45. However, the video data may also be stored in other kinds of storage media, such as the memory card 12.

In the above embodiment, an example in which the invention is applied to the printer 20 has been described. However, the invention may also be applied to other kinds of apparatus, such as the digital video 40 or a multimedia storage viewer, as long as the apparatus creates a still image from video data by using a limited RAM.

What is claimed is:

1. An image processing apparatus that creates a still image from a motion picture including a plurality of images, comprising:

a storage section that has a storage region for correction required in case that a target image with a predetermined determination size is corrected by using a plurality of images;

a size determining section that determines whether or not a size of a target image designated as a still image is equal to or smaller than the determination size;

an image extracting section that extracts from the motion picture a plurality of images including a target image designated as a still image and a first image for correction used in case of performing correction using a plurality of images; and a still image creating section that creates the still image by extracting the plurality of images by means of the image extracting section, and by executing first correction for making a correction using the plurality of images in case that a result of the determination indicates that the size of the target image is equal to or smaller than the determination size and that creates the still image by extracting only the target image designated as the still image by means of the image extracting section, and by executing second correction for correcting the extracted target image in case that the determination result indicates that the size of the target image is larger than the determination size.

2. The image processing apparatus according to claim 1, wherein the still image creating section comprises:

a region setting section that sets a noted pixel from a plurality of pixels of the target image designated as the still image in case that the determination result indicates that the size of the target image is equal to or smaller than the determination size, sets a region to be corrected that includes the set noted pixel and is corrected on the basis of information on the other pixels, for a part of the target image, and sets a region for correction that is a larger region than the region to be corrected and is used to correct the region to be corrected, for the part of the target image and a part of the first image for correction;

a correction determining section that calculates the similarity between the set target image or a region for correction of the first image for correction and the region to be corrected of the set target image in a state where the size of the region for correction is made to match the size of the region to be corrected, and that determines whether or not the region to be corrected is correctable by the region for correction on the basis of the calculated similarity; and a correction executing section that executes the first correction for correcting the region to be corrected by using the region for correction in case that the determination result indicates that the region to be corrected is correctable by the region for correction.

3. The image processing apparatus according to claim 2, wherein the still image creating section includes an edge determining section that determines whether or not the set noted pixel exists in a predetermined edge region, and the correction executing section corrects the region to be corrected by using the region for correction in case that the determination result indicates that the region to be corrected is correctable by the region for correction and the set noted pixel exists in the edge region.

4. The image processing apparatus according to claim 3, wherein the still image creating section creates the still image by correcting the noted pixel of the target image by noise elimination processing using the target image in case that the set noted pixel does not exist in the edge region.

5. The image processing apparatus according to claim 1, wherein the still image creating section executes at least one of sharpness processing and noise elimination processing as the second correction.

6. The image processing apparatus according to claim 1, wherein when there is an empty region other than the storage region for correction in the storage section, the size determining section sets the determination size on the basis of the storage region for correction and the empty region and determines whether or not the size of the target image designated as the still image is equal to or smaller than the set determination size.

7. A printing apparatus comprising:

the image processing apparatus according to claim 1; and a printing executing section that performs processing for printing a still image that is created by the image processing apparatus onto a print medium.

8. An image processing method using an image processing apparatus that creates a still image from a motion picture including a plurality of images and includes a storage section that has a storage region for correction required in case that a target image with a predetermined determination size is corrected by using a plurality of images and an image extracting section that extracts from the motion picture a plurality of images including a target image designated as a still image and a first image for correction used in case of performing correction using a plurality of images, the image processing apparatus including a processor for executing control comprising:

determining, using the processor, whether or not the size of the target image designated as a still image is equal to or smaller than the determination size; and creating the still image by extracting the plurality of images by means of the image extracting section, and by executing first correction for making a correction using the plurality of images in case that a determination result obtained in the determining indicates that the size of the target image is equal to or smaller than the determination size and creating the still image by extracting only the target image designated as the still image by means of the image extracting section, and by executing second correction for correcting the extracted target image in case that the determination result indicates that the size of the target image is larger than the determination size.

* * * * *